(12) United States Patent
Adrien et al.

(10) Patent No.: US 7,943,093 B2
(45) Date of Patent: May 17, 2011

(54) COVER SLIP

(75) Inventors: Christopher L. Adrien, Somersworth, NH (US); N. Guy Cosby, Dover, NH (US); David J. Moore, Portsmouth, NH (US); Mark G. Robinson, Rye, NH (US); Paul Sanford, Portsmouth, NH (US)

(73) Assignee: Erie Scientific Company, Portsmouth, NH (US)

( * ) Notice: Subject to any disclaimer, the term of this patent is extended or adjusted under 35 U.S.C. 154(b) by 806 days.

(21) Appl. No.: 10/021,602

(22) Filed: Dec. 12, 2001

(65) Prior Publication Data
US 2003/0109059 A1 Jun. 12, 2003

(51) Int. Cl.
*B01L 3/00* (2006.01)

(52) U.S. Cl. .................................. 422/102; 435/288.3

(58) Field of Classification Search ............... 422/100, 422/102; 359/396, 398; 356/244, 246; 435/288.3, 435/288.4, 288.5
See application file for complete search history.

(56) References Cited

U.S. PATENT DOCUMENTS

| | | | |
|---|---|---|---|
| 1,654,369 A | 12/1927 | George | |
| 2,942,520 A | 6/1960 | Rose | |
| 3,556,633 A | 1/1971 | Mutschmann et al. | |
| 3,572,892 A | 3/1971 | Metzgar et al. | |
| 3,879,106 A * | 4/1975 | McCormick | 359/398 |
| 3,960,268 A | 6/1976 | Davis et al. | |
| 4,022,521 A | 5/1977 | Hall et al. | |
| 4,171,866 A * | 10/1979 | Tolles | 356/39 |
| 4,260,392 A | 4/1981 | Lee | |
| 4,447,140 A * | 5/1984 | Campbell et al. | 359/396 |
| 4,481,246 A | 11/1984 | Melisz et al. | |
| 4,501,496 A | 2/1985 | Griffin | |

(Continued)

FOREIGN PATENT DOCUMENTS

DE 3830721 3/1990

(Continued)

OTHER PUBLICATIONS

Erie Scientific Company, *Microscope Slides and Cover Glass Dealer Price List*, Oct. 1, 2000.

(Continued)

*Primary Examiner* — Jill Warden
*Assistant Examiner* — Dwayne K Handy
(74) *Attorney, Agent, or Firm* — Wood, Herron & Evans, LLP

(57) ABSTRACT

A cover slip for forming a chamber of the type for use with a hybridization reaction or similar molecular search. The cover slip has a surface and two substantially parallel, opposed edges bounding the surface. A spacer has a pair of spacer segments, and each spacer segment extends along substantially a full length of a different one of the opposed edges, thereby forming a chamber between the spacer segments, the cover slip and the substrate. The chamber receives the specimen when the cover slip is placed on the substrate with the spacer sandwiched therebetween. The cover slip has a thickness providing a beam stiffness permitting the cover slip to maintain a substantially constant distance between the surface and the substrate when a liquid is introduced between the cover slip and the substrate. In another embodiment, the spacer extends along the perimeter of the cover slip and has discontinuities forming two channels across the perimeter for introducing the liquid therethough. The spacer determines a distance between the cover slip and the substrate; and by extending along most of the perimeter of the cover slip, the spacer substantially reduces evaporation of the liquid.

15 Claims, 5 Drawing Sheets

U.S. PATENT DOCUMENTS

| | | | |
|---|---|---|---|
| 4,595,561 A | | 6/1986 | Thornton et al. |
| 4,624,882 A | | 11/1986 | Melisz et al. |
| 4,647,543 A | | 3/1987 | Stocker |
| 4,679,914 A | | 7/1987 | Rosenberg |
| 4,731,335 A | | 3/1988 | Brigati |
| 4,777,020 A | | 10/1988 | Brigati |
| 4,790,640 A | | 12/1988 | Nason |
| 5,002,736 A | | 3/1991 | Babbitt et al. |
| 5,192,503 A | * | 3/1993 | McGrath et al. ............... 422/57 |
| 5,349,436 A | | 9/1994 | Fisch |
| 5,571,721 A | | 11/1996 | Turner |
| RE35,589 E | * | 8/1997 | Fisch ........................... 356/246 |
| 5,681,741 A | | 10/1997 | Atwood et al. |
| 5,812,312 A | | 9/1998 | Lorincz |
| 5,939,251 A | | 8/1999 | Hu |
| 5,958,760 A | * | 9/1999 | Freeman .................... 435/286.5 |
| 6,037,168 A | | 3/2000 | Brown |
| 6,180,314 B1 | | 1/2001 | Berndt |
| 6,218,191 B1 | | 4/2001 | Palander |
| 6,277,629 B1 | | 8/2001 | Wolf et al. |
| 6,489,171 B1 | * | 12/2002 | Aghassi et al. ............... 436/180 |

FOREIGN PATENT DOCUMENTS

EP       0 961 110 A      12/1999

OTHER PUBLICATIONS

Erie Scientific Company, Brochure for a LIFTERSLIP premium printed cover glass.
Specification sheet for a HYBRIWELL sealing system.
Instructions for use for a HYBRIWELL.
Detailed drawings of a glass product sold by Erie Scientific at least since 1999.
Official Letter, European Patent Office, Application No. 02794211.9, Apr. 7, 2008 (5 pages).
European Patent Office, Office Action, Application No. 02 794 211.9-2217, EPO Form 2906, Date Nov. 24, 2008 (6 pages).

* cited by examiner

COVER SLIP

FIELD OF THE INVENTION

This invention relates to a cover slip of the type used to contain a specimen on a substrate for use in a hybridization reaction or similar molecular search.

BACKGROUND OF THE INVENTION

Molecular searches use one of several forms of complementarity to identify the macromolecules of interest among a large number of other molecules. Complementarity is the sequence-specific or shaped-specific molecular recognition that occurs when two molecules bind together. Complementary between a probe molecule and a target molecule can result in the formation of a probe-target complex. This complex can then be located if the probe molecules are tagged with a detectible entity such as a chromophore, fluorophore, radioactivity, or an enzyme. There are several types of hybrid molecular complexes that can exist. A single-stranded DNA (ssDNA) probe molecule can form a double-stranded, base pair hybrid with an ssDNA target if the probe sequence is the reverse complement of the target sequence. An ssDNA probe molecule can form a double-stranded, base-paired hybrid with an RNA target if the probe sequence is the reverse complement of the target sequence. An antibody probe molecule can form a complex with a target protein molecule if the antibody's antigen-binding site can bind to an epitope on the target protein. There are two important features of hybridization reactions. First, the hybridization reactions are specific in that the probes will only bind to targets with a complementary sequence, or in the case of proteins, sites with the correct three-dimensional shape. Second, hybridization reactions will occur in the presence of large quantities of molecules similar but not identical to the target. A probe can find one molecule of a target in a mixture of a zillion of related but non-complementary molecules.

There are many research and commercially available protocols and devices that use hybridization reactions and employ some similar experimental steps. For example, microarray (or DNA chip) based hybridization uses various probes which enable the simultaneous analysis of thousands of sequences of DNA for genetic and genomic research and for diagnosis. Most DNA microarray fabrications employ a similar experimental approach. The probe DNA with a defined identity is immobilized onto a solid medium. The probe is then allowed to hybridize with solutions of nucleic acid sequences, or conjugates, that contain a detectable label. The signal is then detected and analyzed. Variations of this approach are available for RNA-DNA and protein-protein hybridizations and those hybridization techniques involving tissue sections that are immobilized on a substrate. In all of these protocols, the hybridization solution is placed directly on the substrate that contains the immobilized DNA or tissue section.

Usually the hybridization reaction is performed in a warm environment, and one problem is that the hybridization solution may evaporate resulting in inadvertent contamination of the solution that is on the substrate. To prevent evaporation, a cover slip is placed directly on the solution. The weight of the cover slip, however, can displace the solution and minimize the volume of the solution that is in contact with the immobilized component. Therefore, a portion of the immobilized component may have an insufficient amount or no hybridization solution covering it.

In an attempt to reduce the displacement of the cover slip, it is known to print ink as bars on two opposed edges of the cover slip. The ink structures raise the cover slip above the substrate thus providing a chamber and a larger volume or space for the hybridization solutions. However, the cover slip is often made from a #2 cover glass that has a nominal thickness of about 0.2 millimeters ("mm"). As will be appreciated, a nominal thickness of 0.2 mm means that, if measured, the cover glass thickness may vary in a range of about 0.17-0.25 mm. Further, the dimensional range of cover glass also varies with the supplier; and thus, a variation in the measured dimension from the nominal dimension is to be expected. A cover glass that is 0.2 mm thick is thin and flexible. Further, the cover slip is readily flexed or bent by the application of a very small force. For example, in reacting adhesion forces resulting from the hybridization solution being introduced between the coverslip and the substrate, a center portion of the cover slip between the printed ink bars can be warped or pulled toward the substrate. Once again, the hybridization solution is displaced resulting in an unequal dispersion of the components in the solution over the immobilized component. Alternatively, in filling the space between the cover slip and the substrate with hybridization solution, the cover slip can be warped or pushed outward. Pushing the cover slip outward increases the volume of the chamber. Under other circumstances, the very thin cover slip can unpredictably warp or bend due to forces inherent within the structure of the glass or from forces generated by the printing and curing of the ink bars on the cover slip.

Regardless of its cause, any bending, deflecting or warping of the cover slip results in different distances between the cover slip and the substrate; and that warping and bending of the cover slip can cause substantial variations in the size of the chamber between the cover slip and the substrate. One disadvantage of varying spacing between the cover slip and the substrate is that different amounts of hybridization solution are dispersed to different areas over the immobilized component, thereby producing a less consistent hybridization reaction and less consistent hybridization results. Another disadvantage of varying spacing between the cover slip and the substrate is that greater volumes of hybridization solutions will be used. Using more than the minimum necessary adds unnecessary cost to the hybridization reaction. It has been found that with the opposed printed bars on the cover slip, evaporation of the hybridization solution continues to be a problem. In addition, the bending and/or warping of a cover slip results in a varying distance between the cover slip and substrate from one cover slip/substrate combination to another. Again, that nonuniformity between cover slip/substrate combinations often leads to inconsistent results as well as an increased process cost due to the use of more hybridization solution.

Thus, there is a need for a cover slip for use with a substrate that provides more consistent results from a hybridization reaction or similar molecular search, uses a consistent and minimum amount of hybridization solution or other liquid, and further reduces evaporation.

SUMMARY OF THE INVENTION

The present invention provides a cover slip that substantially improves the quality of a hybridization reaction or similar molecular search with which it is used. The cover slip of the present invention provides uniform dispersion of components of a hybridization solution throughout a chamber formed between the cover slip and a substrate, thereby improving the consistency and quality of the hybridization reaction. The cover slip of the present invention further permits the volume of the chamber between the cover slip and the substrate to be minimized without adversely affecting the uniformity of the dispersion of the hybridization solution. Thus, with the cover slip of the present invention, the quantity of hybridization solution used is minimized; and the cost of the hybridization reaction is reduced. Further, with the cover slip of the present invention, the improved process quality is repeatable from one cover slip/substrate combination to another.

According to the principles of the present invention and in accordance with the described embodiments, the invention provides an apparatus of the type used to contain a liquid over a specimen on a substrate. The apparatus has a pair of spacer segments and a cover slip that has a surface and two substantially parallel, opposed edges bounding the surface. Each of the spacer segments extends along substantially a full length of a different one of the opposed edges, thereby forming a chamber between the spacer segments, the cover slip and the substrate. The chamber receives the specimen when the cover slip is placed on the substrate with the spacer sandwiched therebetween. The cover slip has a thickness providing a beam stiffness permitting the cover slip to maintain a substantially constant distance between the surface and the substrate when the liquid is introduced between the cover slip and the substrate. Thus, the cover slip is able to react adhesion forces resulting from the liquid being introduced between the cover slip and the substrate without displacing liquid from over the specimen. In one aspect of this invention, the cover slip is glass and has a thickness in a range of about 0.3-2.0 mm.

In another embodiment of the invention, an apparatus of the type used to contain a liquid over a specimen on a substrate has a cover slip with a perimeter bounding a surface. A spacer is disposed between the cover slip and the substrate. The spacer extends along the perimeter of the cover slip and has discontinuities forming two channels across the perimeter for introducing the liquid therethough. The spacer determines a distance between the cover slip and the substrate. By extending along most of the perimeter of the cover slip, the spacer substantially reduces evaporation of the liquid. In one aspect of this invention, the discontinuities form four channels across the perimeter at corners of the cover slip.

In another embodiment of the invention, a method for use with a chamber containing a specimen first provides the substrate having a specimen on a surface thereof. Next a spacer is disposed between a cover slip and the substrate to form a chamber therebetween. The spacer extends substantially over a full length of the perimeter and has discontinuities forming channels that extend across the spacer and intersect the chamber.

In one aspect of this method, a liquid is deposited on the substrate adjacent a first channel, and the liquid is introduced into the chamber via capillary action. The cover slip reacts the adhesion forces of the liquid in the chamber and maintains a substantially constant distance between the cover slip and the substrate.

These and other objects and advantages of the present invention will become more readily apparent during the following detailed description taken in conjunction with the drawings herein.

DETAILED DESCRIPTION OF THE INVENTION

Figure 1A:
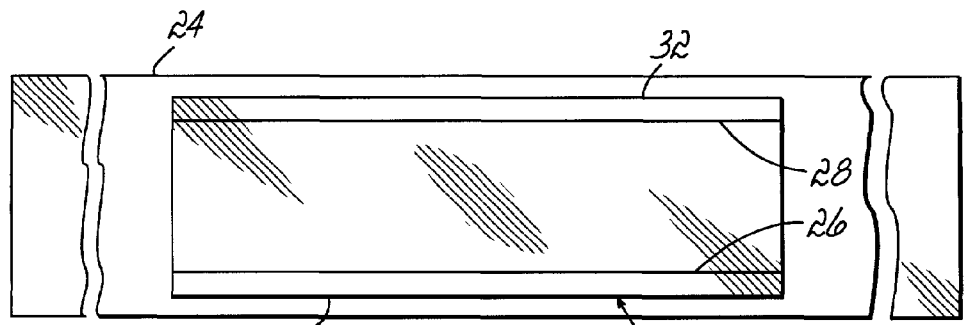
FIGS. 1A-1C are orthogonal views of a first embodiment of a cover slip in combination with a substrate in accordance with the principles of the present invention.
Figure 1B:
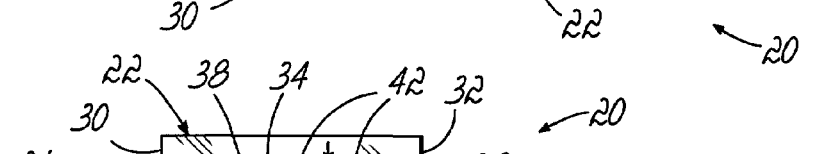
Figure 1C:
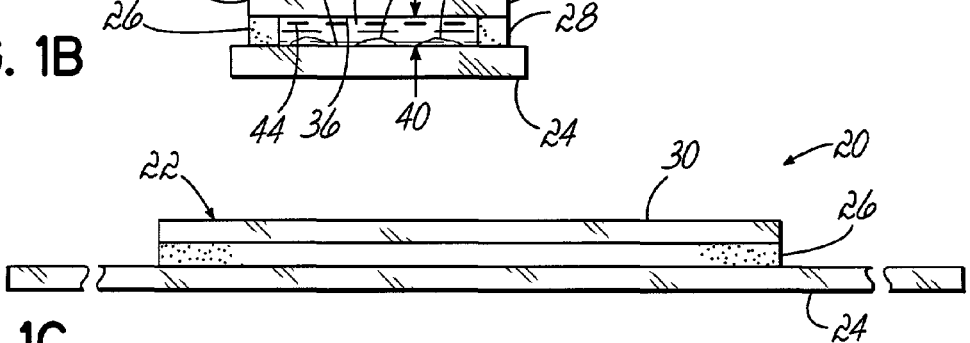

Referring to FIGS. 1A-1C, a cover slip/substrate combination 20 is comprised of a cover slip 22 and a support or substrate 24. The substrate 24 may be any material suitable for the reaction being conducted, for example, a DNA chip, microarray, a glass slide, such as a 25×75 mm microscope slide, or any other type of suitable support. A microscope slide has a thickness of about 1.016 mm. The cover slip 22 is illustrated as being smaller in width than the substrate 24, for example, about 22 mm. However, in the embodiment of FIG. 1, the cover slip 22 may have even a smaller width, the same width or a larger width than the substrate 24. Further, the length of the cover slip 22 may be any size; and as will be appreciated, the length and width of the cover slip 22 will depend on their application and the equipment and practices of a user. Affixed to the cover slip 22 are an opposed pair of spacer bars 26, 28 extending substantially the full length of respective longitudinal edges 30, 32.

A reservoir or chamber 34 is formed between a cover slip lower surface 36 and a substrate upper surface 38. The chamber 34 often contains an immobilized material 42, for example, a tissue sample, DNA or other hybridizable material. Other hybridizable materials include isolated RNA and protein, and human, animal and plant tissue sections containing DNA, RNA, and protein that are used for research and diagnostic purposes. The chamber 34 also contains a liquid 44, for example, a liquid hybridization solution. Cover slips used in such hybridization reactions are relatively thin, that is, the thickness is in a range of about 0.17-0.25 mm. As discussed, such a thin cover slip unpredictably warps or bends during use and from one cover slip to another. In addition, the application of the spacer bars 26, 28 onto the surface 36 often requires a heat curing process that also can result in the warping and bending of the cover slip. Such warping and bending is a primary cause of the variations in the chamber height 40 in a cover slip/substrate combination. Further, as discussed earlier, variations in chamber height 40 cause inconsistent and poor quality hybridization reaction results, excessive use of hybridization solution and a more expensive hybridization reaction. Further, those disadvantages extend from cover slip/substrate combination to another.

To overcome those disadvantages, the cover slip 22 is thicker than known cover slips used with hybridization reactions. If the cover slip 22 is glass, nominal thicknesses of 0.30 mm, 0.40 mm and 0.5 mm can be used; and such thicknesses are commercially available as #3, #4 and #5 cover glasses, respectively from Erie Scientific Co. of Portsmouth, N.H. In addition, the cover slip 22 can be made from a commercially available glass that is used to make microscope slides and that has a nominal thickness of about 1.0 mm. Higher quality microscope slide glass that has a flatness of about ±0.005 mm provides a more uniform spacing between the cover slip and the substrate. An even thicker cover glass can be used, for example, a glass having a thickness of 2.0 mm or more. A desired thickness is a function of the price of the glass, ease and cost of handling and cutting the glass, as well as the applications and equipment of a customer, for example, a thinner cover slip and substrate combination will fit in more hybrid chambers. Therefore, cover slips having a thickness of in a range of about 0.3-1.2 mm will be often used; and a cover glass made from a higher quality microscope slide glass having a thickness of about 1.0 mm will probably be most often used. The thicker cover slip 22 is rigid and inflexible and has an inherent beam stiffness that keeps it from warping and bending during either the heat curing process or its use. With a substantially flat lower surface 36, a substantially constant chamber height 40 is maintained between the confronting surfaces 36, 38. Thus, with the thicker cover slip 22, the spacer bars 26, 28 now effectively function to exclusively control the chamber height 40 and hence, the volume of the chamber 34.

Further, the chamber height 40 is also substantially constant from one cover slip/substrate combination to another. Hence, with the thicker cover slip 22 and a more consistent chamber height 40, components of the hybridization fluid are more uniformly distributed throughout the chamber; and that provides a more consistent and repeatable hybridization reaction. In addition, being able to consistently control the volume of the chamber 40 from one cover slip/substrate combination to another also permits the use of the hybridization solution to be optimized.

The desired size of the chamber 40, and hence, the amount of hybridization solution used is influenced by the expected evaporation of the fluid. The expected evaporation may vary depending of the hybridization reaction being performed. Therefore, if it is possible to substantially reduce evaporation of the solution 44 in the chamber 34, the size or volume of the chamber 34 can be reduced, thereby further reducing the quantity of hybridization fluid used and further reducing the cost of the hybridization reaction.

Figure 2A:
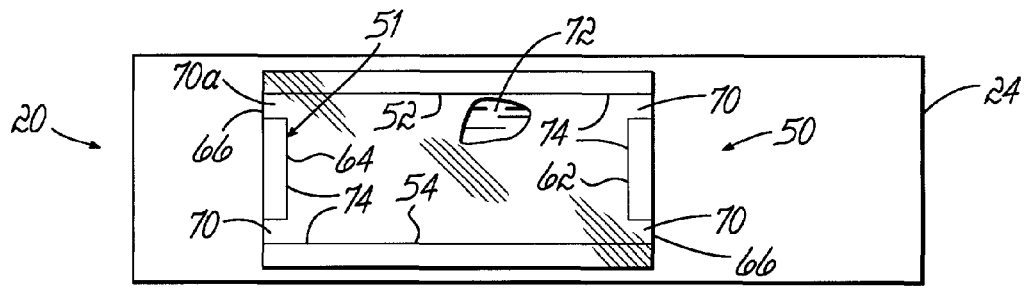
FIGS. 2A-2C are orthogonal views of a second embodiment of a cover slip in combination with a substrate in accordance with the principles of the present invention.
Figure 2B:
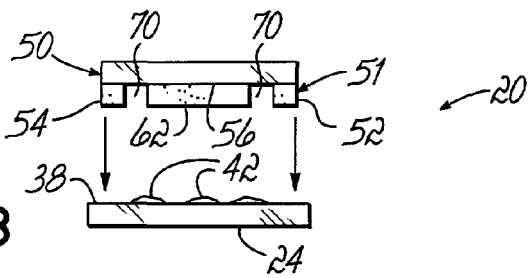
Figure 2C:
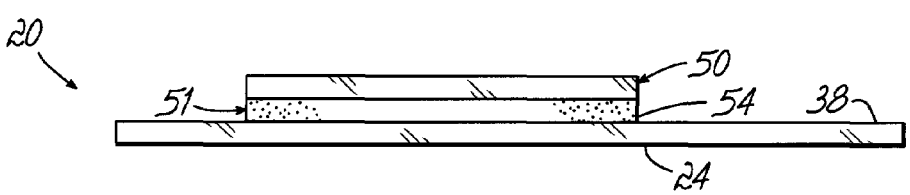

One embodiment of a cover slip that reduces the evaporation of the hybridization solution is illustrated in FIGS. 2A-2C. A spacer 51 extends along a perimeter of a lower surface 56 of a cover slip 50. The spacer 51 has discontinuities that form a first pair of opposed spacer segments 52, 54 and a second pair of opposed spacer segments 62, 64. Further, the discontinuities in the spacer 51 form openings, ports or channels 70 in the spacer 51 between ends of the spacer segments 52, 54, 62, 64. A reservoir or chamber 72 for containing a hybridization solution is formed between the cover slip lower surface 56, the substrate upper surface 38 and the inner directed sides 74 of the spacer segments 52, 54, 62, 64. The use of the spacer 51 to almost fully surround the chamber 72 is highly effective in substantially reducing evaporation of the hybridization solution from the chamber. The spacer 51 shown in the embodiment illustrated in FIG. 2 provides four channels or ports 70 in which a hybridization solution can be introduced into the chamber 72 and therefore, is known as a four-channel spacer.

In one embodiment, the spacer segments 52, 54, 62, 64 are formed by printing bars of ink on the cover slip lower surface 56. The width of the ink bars may vary depending on the application, but often it is desirable to minimize the width of the ink bars, for example, to about 0.75 mm, so that more area on the cover slip lower surface 56 is available for the chamber 72. The ink bars are printed to form channels 70 of a size that permits a hybridization solution or other liquid to be introduced through the channels 70 and into the chamber 72. The ink bars are printed with a commercially available ink using an SMT printer commercially available from Affiliated Manufacturers, Inc. of North Branch, N.J. With such a screen printing process, the maximum height that can be obtained in a single printed bar is limited by the ink being used. For example, using an ink that is used to provide a frosted coating label or indicia portion at an end of a microscope slide, an ink bar having a thickness in a range of about 0.030-0.040 mm can be printed on the cover slip. If a greater thickness is required, a second ink bar can be printed over the first ink bar to provide a thickness of about 0.050-0.060 mm. Alternatively, the spacer segments 52, 54, 62, 64 can be made from filled inks, double sided tape, etc. The width of the channels 70 also varies depending on many factors, for example, the viscosity and other physical characteristics of the liquid passing therethrough, the hydrophobic property of the spacer segments, the nature of the process being performed on the specimen on the substrate, etc. Thus, the size or width of the channels 70 is often determined experimentally; however, once determined, the cover slip 22 permits the process and results to be uniformly repeated.

In use, many hybridization type reactions involving single or double stranded nucleic acid and protein components or conjugates can be performed on the substrate surface 38. A sample or material 42, for example, DNA, a microarray of DNA, a tissue section or other material under study, is immobilized on the substrate surface 38 in a known manner. The cover slip 50 is then placed over the substrate 24 to form the chamber 72. The cover slip/substrate combination 20 is then cleaned with compressed air to remove all particles. A volume of hybridization solution is aspirated into a pipette tip.

The pipette tip is then located adjacent a channel 70a that is closest to but not touching the sample 42. The hybridization solution is dispensed onto the substrate surface 38 immediately adjacent the channel or capillary port 70a. As the hybridization solution is expelled from the pipette tip and onto the substrate surface 38, it spreads through the capillary port 70a and under the cover slip 50 via capillary action. As hybridization solution is introduced through the channel 70a, it pushes air from the chamber 72 via the other channels 70. The introduction of hybridization solution into the chamber 72 continues until the sample is covered with solution and the chamber is filled. As will be appreciated, the hybridization solution may not evenly disperse through the chamber 72 when introduced via the channel 70a. The location of hybridization solution and air bubbles, if any, can be viewed through the translucent cover slip 50. Hybridization solution can then be introduced following a similar procedure with the pipette tip at other of the channels 70 until the chamber 72 is properly filled and air bubbles are removed. When the area under the cover slip 50 is completely full, there may be some excess hybridization solution pooling at the channels 70. This excess solution works to ensure a uniform hybridization intensity. The spacer bars 52, 54, 62, 64 are very effective to prevent the hybridization solution from evaporating during the hybridization reaction. Further, the consistency of the chamber height across the cover slip 50 ensures a high quality hybridization reaction; and that quality can be maintained from one cover slip/substrate combination to another. As will be appreciated, the cover slip 50 can used in other similar molecular searches involving molecules such as proteins.

Figure 3:
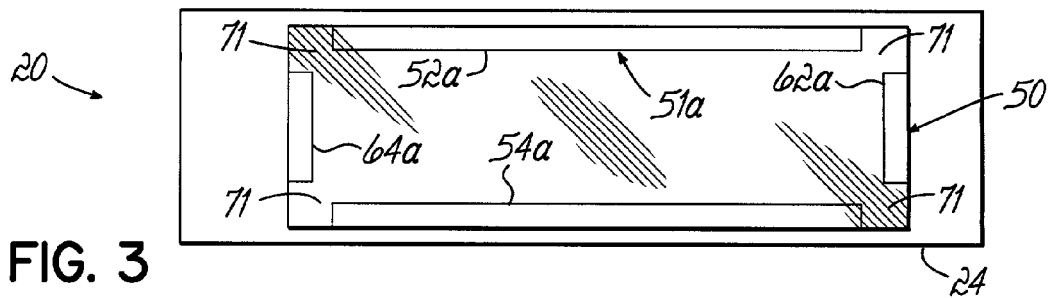
FIGS. 3-4 are top plan views of other embodiments of a cover slip in combination with a substrate in accordance with the principles of the present invention.
Figure 4:
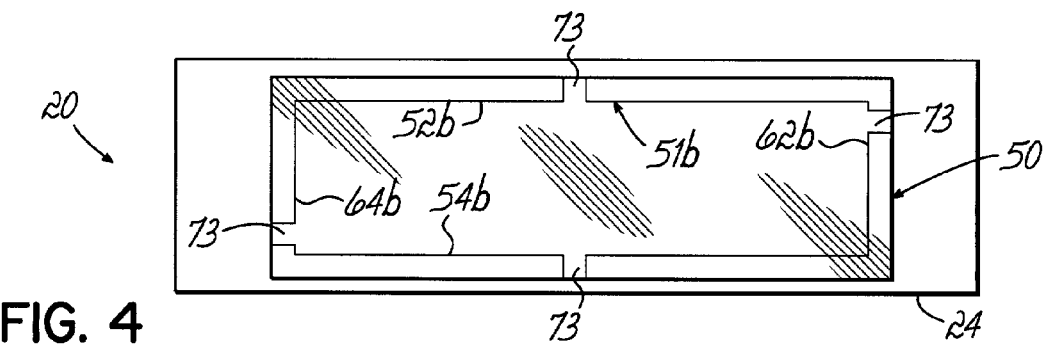

The discontinuities forming the channels 70 in the spacer 51 can be placed at different locations along the perimeter of the cover slip 22. For example, referring to FIG. 3, discontinuities in a spacer 51*a* on the cover slip 50 form channels 71 adjacent the ends of spacer segments 52*a*, 54*a*, 62*a*, 64*a*. FIG. 4 illustrates a further embodiment in which discontinuities in the spacer 52*b* form channels 73 intermediate of the spacer segments 52*b*, 54*b*, 62*b*, 64*b*.

Figure 5A:
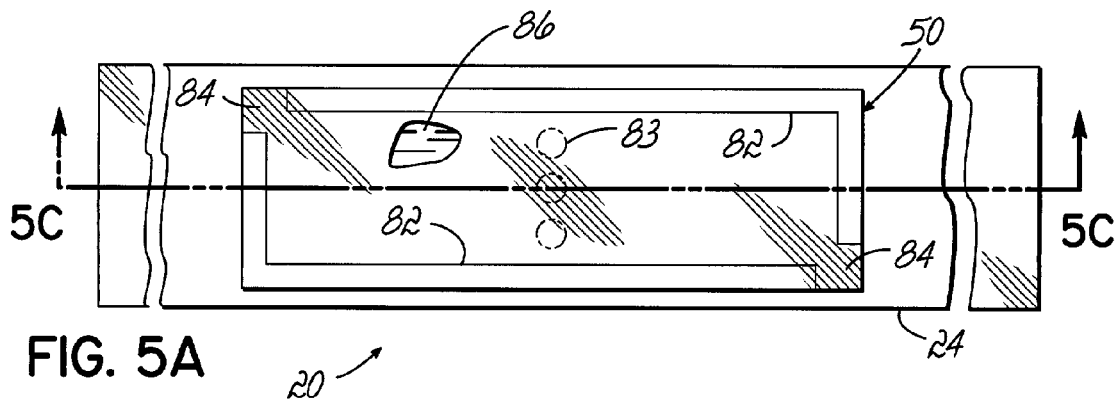
FIGS. 5A-5C are orthogonal views of a further embodiment of a cover slip in combination with a substrate in accordance with the principles of the present invention.
Figure 5B:
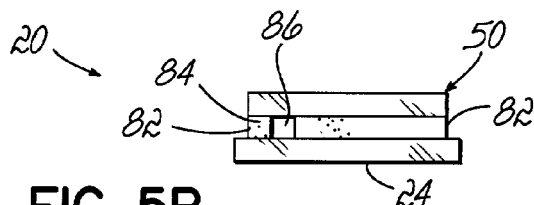
Figure 5C:
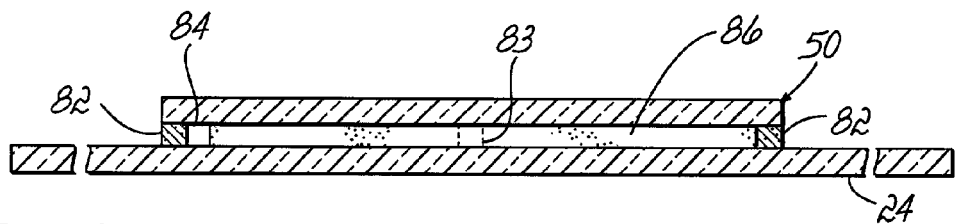

A further embodiment of the invention is illustrated in FIGS. 5A-5C. A spacer 82 extends substantially along almost all of the perimeter of the cover slip 50. The spacer 82 has two discontinuities forming channels 84 at diagonally opposite corners of the cover slip 50. A chamber 86 is bounded by the spacer 82, the cover slip 50 and the substrate 24. The hybridization solution is introduced via one of the channels 84 in a similar process to that described above with respect to FIG. 2. The spacer 82 shown in the embodiment illustrated in FIG. 5 provides two channels or ports in which the hybridization solution can be introduced into the chamber 86 and therefore, is known as a two-channel spacer.

FIG. 5 also illustrates a further embodiment relating to additional spacers 83 disposed between the cover slip 50 and the substrate 24. The additional spacers 83 are useful in those applications where additional structure is needed to maintain a fixed distance between the cover slip 50 and substrate 24. For example, in some applications, the cover slip 50 may be substantially longer than it is wide and require additional support at its midsection or at some other area or point on the cover slip 50. The additional spacers 83 may be identical or similar in shape to the spacer 82, or the spacers 83 may have any cross-sectional shape, for example, round, square, rectangular, etc. The geometry, number and location of the additional spacers 83 are chosen so that they do not interfere with the hybridization reaction. The additional spacers 83 may be printed on the cover slip 50, the substrate 24 or both using a process similar to that used to print the spacer 82 or any other suitable process.

Figure 6:
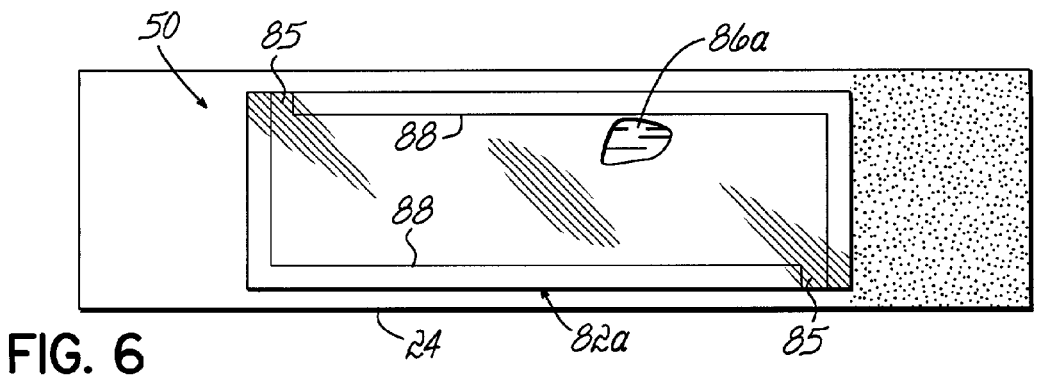
FIGS. 6-9 are top plan views of still further embodiments of a cover slip in combination with a substrate in accordance with the principles of the present invention.
Figure 7:
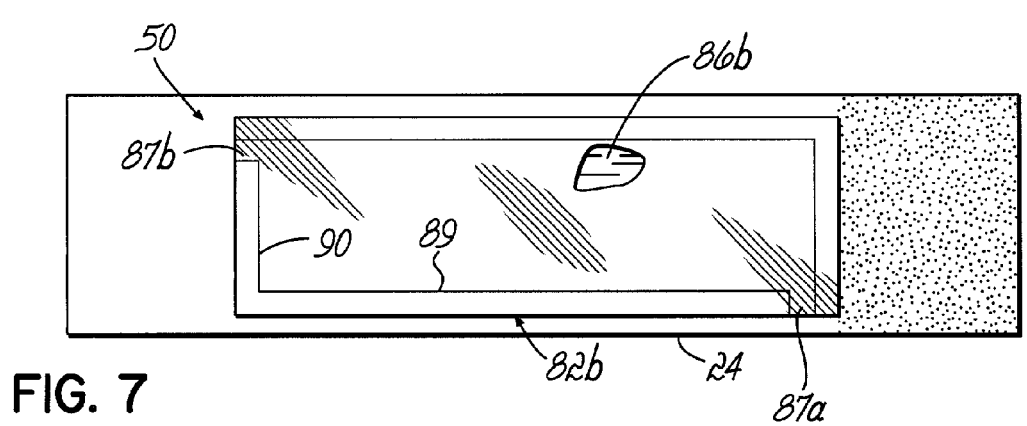
Figure 8:
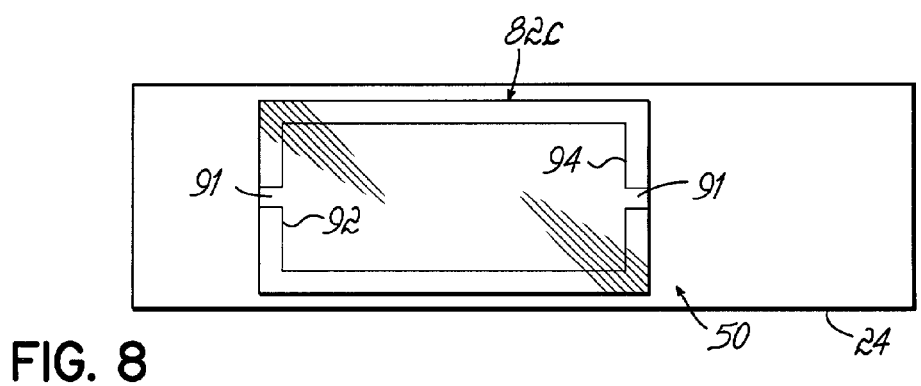
Figure 9:
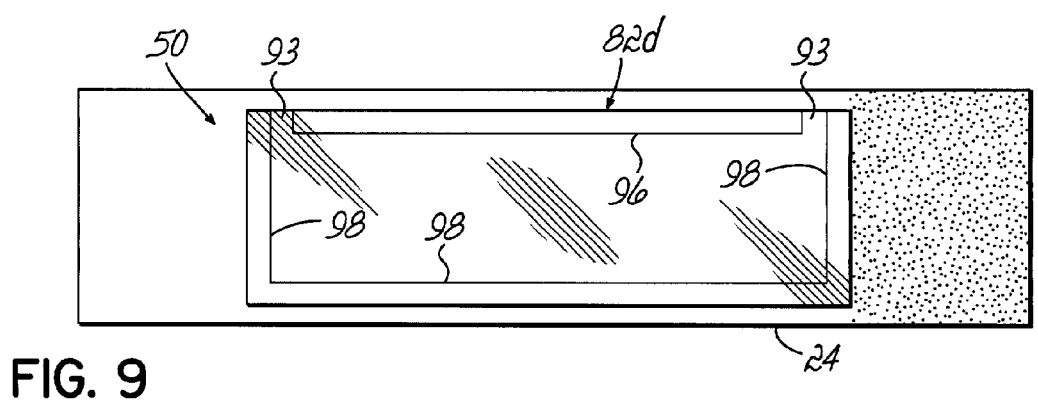

FIG. 6 illustrates another embodiment in which a two-channel spacer 82*a* is used with the cover slip 50. In this embodiment, a spacer 82*a* extends along the perimeter of the cover slip 50 and discontinuities in the spacer 82*a* form diagonally opposed channels 85. The channels 85 cross the perimeter of the cover slip 50 at ends of longitudinal spacer segments 88. In another embodiment illustrated in FIG. 7, a spacer 82*b* extends along a perimeter of the cover slip 50 and has discontinuities that form diagonally spaced channels 87. However, In this embodiment, one of the channels 87*a* crosses the perimeter adjacent an end of the longitudinal spacer segment 89; and the other channel 87*b* crosses the perimeter adjacent an end of a spacer segment 90 of the spacer 82*b*. In a further embodiment illustrated in FIG. 8, a spacer 82*c* extending along the perimeter of the cover slip 50 has discontinuities forming opposed channels 91 that cross the perimeter intermediate ends of spacer segments 92, 94. A still further embodiment is illustrated in FIG. 9 in which a spacer 82*d* extends along the perimeter of the cover slip 50 and has discontinuities forming channels 93 adjacent each end of a spacer segment 96. As will be appreciated, in other embodiments, the channels 91 can be formed at ends of any one of the other spacer segments 86.

Figure 10A:
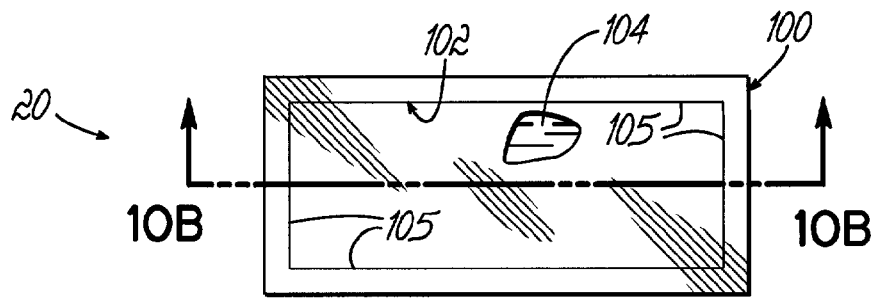
FIGS. 10A-10B are orthogonal views of yet another embodiment of a cover slip in combination with a substrate in accordance with the principles of the present invention.
Figure 10B:
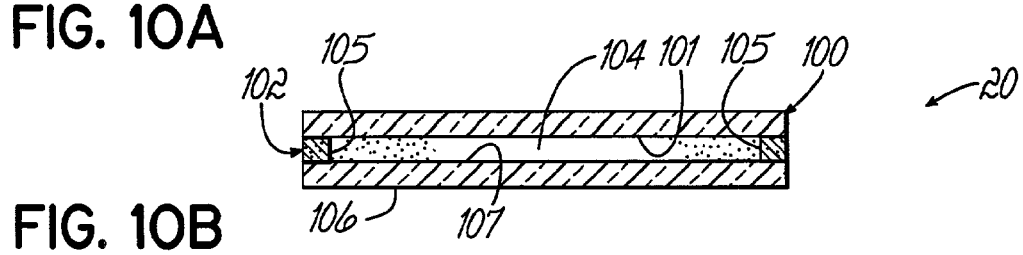

In a further embodiment of the cover slip of the present invention illustrated in FIGS. 10*a*-10*b*, a spacer 102 extends fully along the perimeter of the cover slip 100. In this embodiment, there are no discontinuities in the spacer 102; and therefore, there are no channels that cross the perimeter of a lower surface 101 of the cover slip surface 100. In this embodiment, a chamber 104 is bounded by the inner sides 105 of the spacer 102 and the confronting inner directed surfaces 101, 107 of the respective cover slip 100 and substrate 106. This embodiment also illustrates that the cover slip 100 may be sized identically with the substrate 106. In use, the cover slip 100 is inverted so that the spacer 102 and chamber 104 are directed upward. A pipette is used to fill the chamber 104 with the hybridization solution; and thereafter, the substrate 106 is placed over the inverted cover slip 100, thereby disposing a sample on the substrate 106 into the solution filled chamber 104. The assembly of the cover slip 100 and substrate 106 is then inverted so that the substrate 106 is below the cover slip 100.

Figure 11A:
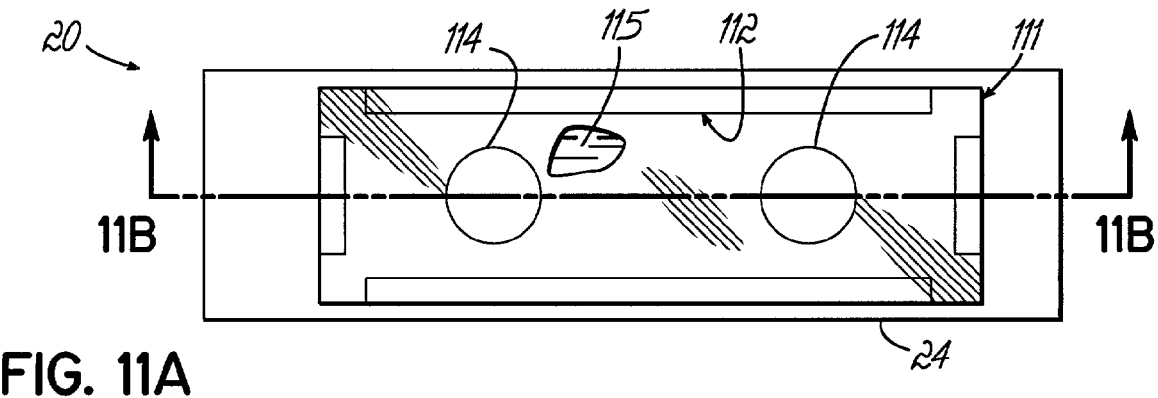
FIGS. 11A-11B are orthogonal views of an additional embodiment of a cover slip in combination with a substrate in accordance with the principles of the present invention.
Figure 11B:
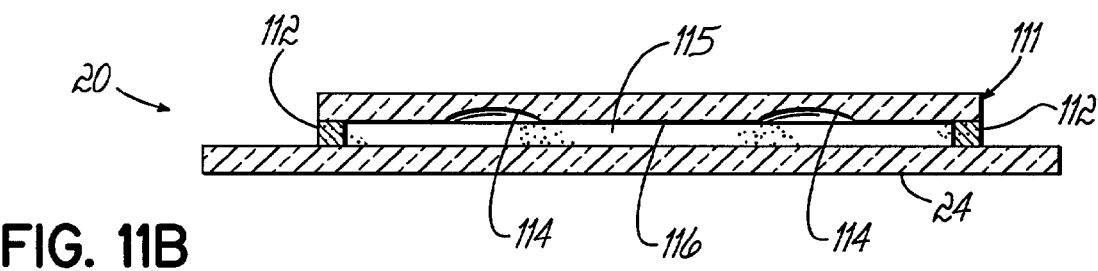

In a still further embodiment illustrated in FIGS. 11A-11B, illustrates a cover slip 111 with a four-channel spacer 112 extending along its perimeter. The cover slip 111 has cavities or depressions 114 formed on an inner directed cover slip surface 116. The purpose of the cavities 114 is to provide a reservoir for additional hybridization solution within a chamber 115 as may be required by a particular process. Normally, centers of the cavities 114 lie on a longitudinal centerline of the cover slip 111. However, as will be appreciated, the cavities 114 may be located on any portion of the surface 116 and further, the number and size of the cavities 114 may be varied to suit the needs of a particular application. In addition, the cavities 114 are shown as being partially spherical. Such cavity geometry is probably the easiest to manufacture, however, in other embodiments, other cavity geometries can be used.

Figure 12:
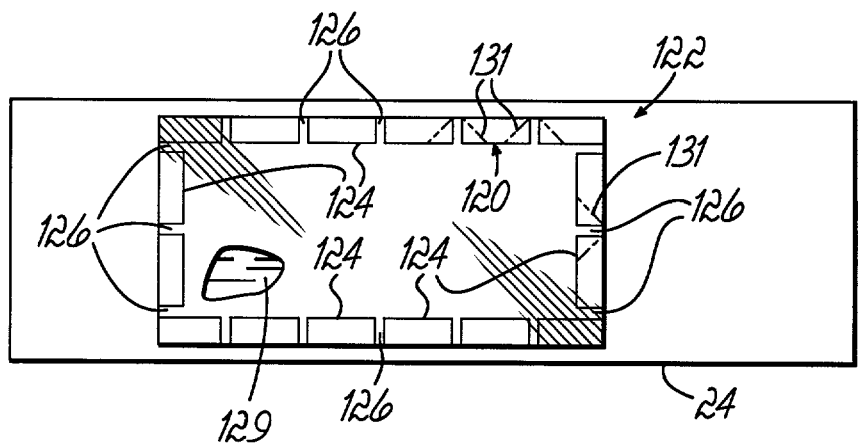
FIGS. 12-13 are top plan views of more embodiments of a cover slip in combination with a substrate in accordance with the principles of the present invention.

In previous embodiments, the spacers used in the cover glass/substrate combinations are illustrated as continuous segments that are separated by discontinuities forming channels for introducing a hybridization solution. As will be appreciated, referring to FIG. 12, a spacer 120 disposed between a cover slip 122 and substrate 24 may be formed by a series of spacer segments 124 that have small discontinuities or spaces 126 therebetween. The spaces 126 are generally sized to inhibit a flow of hybridization solution therethrough and minimize evaporation. Other discontinuities are formed in the spacer 120 to provide one or more larger spaces or channels 128 for introducing a liquid into a chamber 129 as previously described. As the liquid is introduced through the channel 128, air can be bled from the chamber 129 via the smaller spaces 126. One or more of the spaces 126 can be formed into V-shaped spaces 131 (shown in phantom) that can trap air bubbles, so that such bubbles do not interfere with a reaction or process being conducted in the chamber 129. As will be appreciated, the spaces 131 can have other geometric shapes. The relative size of the spaces 126, 128 is determined experimentally depending on the liquid being used, the hydrophobic characteristic of the spacer 120, etc.

Figure 13:
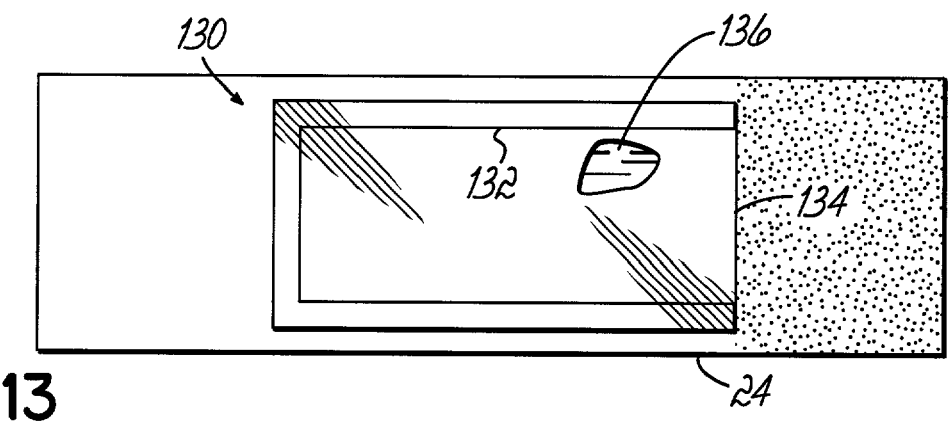

FIG. 13 illustrates a further embodiment of a cover slip 130 in which a spacer 132 extends substantially along a majority of the perimeter of the cover slip 130. In this embodiment, one edge 134 of the cover slip 130 is left open to facilitate the introduction of hybridization solution into a chamber 136.

The cover slip described herein substantially improves the quality of a hybridization reaction or other molecular search with which it is used. For example, in a hybridization reaction, the cover slip provides a uniform dispersion of components of a hybridization solution throughout a chamber between the cover slip and a substrate, thereby improving the consistency and quality of the hybridization reaction. The cover slip further permits the volume of the chamber between the cover slip and the substrate to be minimized without adversely affecting the uniformity of the dispersion of the hybridization solution. Thus, the cover slip helps to reduce the quantity of hybridization solution used, and the cost of the hybridization reaction is reduced. Further, the cover slip improves reaction quality, and such improved quality is repeatable from one cover slip to another.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the spacers between the cover slip and the substrate are described as being formed by printing ink spacers on the cover slip. As will be appreciated, the spacers can alternatively be applied to the substrate instead of the cover slip. In another embodiment, the spacer between the cover slip and the substrate can be formed by spacers applied to, or printed on, both the cover slip and the substrate.

The various described embodiments illustrate that the cover slip is often smaller than the substrate; however, the size of the cover slip will depend on the application and the user's equipment and practices. Cover slips are known to have a width of about 18-24 mm and a length of about 18-60 mm. Further, in many applications, it is desirable to make the cover slip from a glass having optical properties suitable for use with a microscope. However, with other applications, for example, a hybridization reaction, the cover slip only need be translucent enough to view any hybridization solution beneath the cover slip and air bubbles, if any.

In the described embodiment, the cover slip is described as being glass. However, as will be appreciated, in an alternative embodiment, other materials, for example, a plastic material, can be used, providing such materials have characteristics and properties that are suitable for a hybridization reaction or other application.

In the described embodiments, the cover slip and spacer are described as being used in hybridization reactions. However as will be appreciated, the claimed cover slip and spacer provides a tool that can be used more broadly in similar molecular searches that use one of several forms of complementarity to identify the macromolecules of interest among a large number of other molecules. Complementarity is the sequence-specific or shaped-specific molecular recognition that occurs when two molecules bind together. Complementary between a probe molecule and a target molecule can result in the formation of a probe-target complex. This complex can then be located if the probe molecules are tagged with a detectible entity such as a chromophore, fluorophore, radioactivity, or an enzyme.

Therefore, the invention in its broadest aspects is not limited to the specific details shown and described. Consequently, departures may be made from the details described herein without departing from the spirit and scope of the claims which follow.

What is claimed is:

1. A hybridization apparatus of the type providing a chamber for containing a hybridization liquid over a hybridization material immobilized on a substrate comprising:
   a substrate comprising a substantially flat top surface adapted to support an immobilized hybridizable material;
   a cover slip comprising
      a thickness of at least 0.85 mm,
      a substantially flat bottom surface,
      two substantially parallel, opposed longitudinal edges bounding the bottom surface and extending a longitudinal length of the cover slip, and
      a pair of noncontiguous spacer segments attached to the bottom surface of the cover slip, each spacer segment extending substantially contiguously with a full length of a different one of the opposed longitudinal edges and forming a hybridization chamber between the spacer segments, the bottom surface of the cover slip and the top surface of the substrate, the hybridization chamber comprising a substantially constant distance between the bottom surface of the cover slip and the top surface of the substrate, the hybridization chamber extending substantially to opposite ends of the cover slip and comprising an area between the spacer segments of at least 500 square mm, and the hybridization clamber adapted to contain the hybridization material when the cover slip is placed on the substrate with the spacer segments sandwiched therebetween, the cover slip thickness being sufficient to provide a cover slip beam stiffness that prevents adhesion forces from substantially changing the substantially constant distance between the bottom surface of the cover slip and the top surface of the substrate, the adhesion forces being created by the introduction of hybridization liquid into the hybridization chamber.

2. A hybridization apparatus as in claim 1 wherein the cover slip comprises a thickness greater than 1 mm and less than or equal to 2.0 mm.

3. A hybridization apparatus as in claim 1 wherein the cover slip has a flatness of about +/−0.005 mm.

4. A hybridization apparatus as in claim 1 wherein each spacer segment is a thin bar having a width of about 75 mm.

5. A hybridization apparatus as in claim 1 wherein the spacer segments are printed on the bottom surface of the cover slip.

6. A hybridization apparatus as in claim 1 wherein the hybridizable material is arranged in a microarray.

7. A hybridization apparatus as in claim 1 wherein the hybridizable material comprises a nucleic acid.

8. A hybridization apparatus as in claim 1 wherein the hybridizable material comprises a protein.

9. A hybridization apparatus as in claim 1 wherein the hybridization liquid facilitates hybridization reactions between complementary nucleic acids.

10. A hybridization apparatus as in claim 1 wherein the hybridization liquid facilitates hybridization reactions between an antibody and antigen.

11. A hybridization apparatus as in claim 1 wherein the substrate and the cover slip are flat, rectangular glass members.

12. A hybridization apparatus as in claim 1 wherein the thickness of the spacer segments is substantially constant.

13. A hybridization apparatus as in claim 1 further comprising additional spacer segments along the periphery of the bottom surface of the cover slip.

14. A hybridization apparatus as in claim 1 further comprising additional spacer segments on the bottom surface of the cover slip and located between said longitudinal spacer segments.

15. A hybridization apparatus as recited in claim 1 wherein at least two channels are formed between the recited spacer segments for the introduction of hybridization fluid into the hybridization chamber and the venting thereof.

* * * * *

UNITED STATES PATENT AND TRADEMARK OFFICE
CERTIFICATE OF CORRECTION

PATENT NO. : 7,943,093 B2
APPLICATION NO. : 10/021602
DATED : May 17, 2011
INVENTOR(S) : Adrien et al.

It is certified that error appears in the above-identified patent and that said Letters Patent is hereby corrected as shown below:

IN THE SPECIFICATIONS:

In column 1, line 15, change "Complementary between a probe molecule and a target molecule" to --Complementarity between a probe molecule and a target molecule--.

In column 4, line 64, change "Further, those disadvantages extend from cover slip/substrate combination to another." to --Further, those disadvantages extend from one cover slip/substrate combination to another.--.

In column 5, line 15, change "Therefore, cover slips having a thickness of in a range of about 0.3-1.2 mm" to --Therefore, cover slips having a thickness in a range of about 0.3-1.2 mm--.

In column 5, line 41, change "The expected evaporation may vary depending of the hybridization reaction being performed." to --The expected evaporation may vary depending on the hybridization reaction being  performed.--.

In column 7, line 49, change "However, In this embodiment," to --However, in this embodiment,--.

In column 8, line 15, change "In a still further embodiment illustrated in FIGS. 11A-11B, illustrates a cover slip 111 with a four-channel spacer 112 extending along its perimeter." to --In a still further embodiment, FIGS. 11A-11B illustrate a cover slip 111 with a four-channel spacer 112 extending along its perimeter.--.

In column 9, line 44, change "Complementary between a probe molecule and a target molecule can result in the formation of a probe-target complex." to --Complementarity between a probe molecule and a target molecule can result in the formation of a probe-target complex.--.

Signed and Sealed this
Seventh Day of August, 2012

David J. Kappos
*Director of the United States Patent and Trademark Office*

CERTIFICATE OF CORRECTION (continued)
U.S. Pat. No. 7,943,093 B2

IN THE CLAIMS:

In column 10, claim 4, line 33, change "A hybridization apparatus as in claim 1 wherein each spacer segment is a thin bar having a width of about 75 mm." to --A hybridization apparatus as in claim 1 wherein each spacer segment is a thin bar having a width of about 0.75 mm.--.